United States Patent [19]

Peterson

[11] Patent Number: 5,214,013

[45] Date of Patent: May 25, 1993

[54] ION EXCHANGE MEDIA OF BONDED NATURAL ZEOLITE FINES

[76] Inventor: Stephen L. Peterson, 301 Enchanted Valley, NW., Albuquerque, N. Mex. 87107

[21] Appl. No.: 824,040

[22] Filed: Jan. 21, 1992

[51] Int. Cl.$^5$ .................. B01J 20/20; B01J 20/18
[52] U.S. Cl. ...................................... 502/62
[58] Field of Search ................................ 502/62

[56] References Cited

U.S. PATENT DOCUMENTS

| | | | |
|---|---|---|---|
| 3,091,550 | 5/1963 | Doying | 502/62 |
| 3,219,590 | 11/1965 | Ribaud | 502/62 |
| 3,525,775 | 8/1970 | Bolton | 260/668 |
| 4,187,283 | 2/1980 | Kokotailo et al. | 423/328 |
| 4,196,102 | 4/1980 | Inooka et al. | 252/457 |
| 4,431,749 | 2/1984 | Herttinger, Jr. et al. | 502/68 |
| 4,530,765 | 7/1985 | Sabherwal | 210/663 |
| 4,624,773 | 11/1986 | Hettinger, Jr. et al. | 208/120 |

FOREIGN PATENT DOCUMENTS

| | | | |
|---|---|---|---|
| 33079 | 9/1976 | Japan | 502/62 |
| 140292 | 12/1978 | Japan | 502/62 |
| 146987 | 12/1978 | Japan | 502/62 |
| 1200853 | 9/1986 | Japan | 502/62 |
| 1058600 | 12/1983 | U.S.S.R. | 502/62 |

*Primary Examiner*—Carl F. Dees
*Attorney, Agent, or Firm*—Crutsinger & Booth

[57] ABSTRACT

An ion exchange medium is prepared by pelletizing natural zeolite fines with a lignosuofonate binder, heating the pellets to decompose the lignosulfonate and form a water insoluble carbon matrix binding the fine zeolite particles within the pellet.

20 Claims, 3 Drawing Sheets

ION EXCHANGE MEDIA OF BONDED NATURAL ZEOLITE FINES

TECHNICAL FIELD

This invention relates to ion exchange media and more particularly to a method of preparing an ion exchange medium from natural zeolites for use in removing metal ions and other positive charged ions from aqueous solutions, particularly, waste water streams.

BACKGROUND OF THE INVENTION

Zeolite minerals are framework aluminosilicates with an infinitely extending three-dimensional network of $AlO_4$ and $SiO_4$ tetrahedra linked to each other by sharing of all of the oxygen atoms. This forms a molecular structure with numerous apertures and channelways. The net negative charge of the molecular framework is balanced by the presence of alkali and alkaline earth cations. Calcium, sodium and potassium are loosely bonded to the crystal structure and are free to exchange with cations in solution. Thus, natural zeolites should have good ion exchange properties.

Cation exchange capacity (CEC) is measured by the number of channel situated cations by unit weight that may be replaced by other ions in solution. High CEC in zeolite minerals is favored by a low silica to alumina ratio. Exchange capacity is also higher in monomineralic zeolites with high sodium and low amounts of other exchangeable ions. The zeolite should be hard to provide good resistance to attrition and should have a porous and permeable network of crystals in order to provide rapid diffusion of ions in solution.

Natural zeolites with all of these ideal characteristics are uncommon.

The synthetic zeolites (manufactured analogues of natural zeolites) are molecularly engineered products formed using various compositions of clay, alumina, sodium silicate, caustic soda, etc. designed to have better ion exchange properties than natural zeolites. Synthetic zeolites are widely used in commerce for catalysts of hydrocarbons, adsorption and ion exchange.

Thus, natural zeolites in spite of favorable cost factors are not widely used for removal of metal ions from waste streams. This may be attributed to low ion exchange capacities and to the variability of chemical and physical properties in certain natural zeolites even within a given zeolite deposit. Natural zeolites usually contain several exchangeable cations species. They also usually contain trace amounts of clay, feldspar, silica, and calcite that block channelways resulting in reduced ion exchange well below theoretical capacity. These drawbacks make the natural zeolites highly inferior to synthetic zeolites.

According to the present invention natural zeolite mineral fines are formed into pellets with lignosulfonate as a binding agent and heated until the lignosulfonate is carbonized. The resulting pellets are hard, permeable and water insoluble and show improved ion exchange capabilities and rates of ion exchange as compared to untreated zeolite granules. The pellets demonstrate a high affinity for the removal of lead, cadmium and other metal and non-metal ions from waste water streams.

The process of the present invention for pelletizing zeolite fines with a carbon matrix enhances the ion exchange properties of the natural zeolites making their commercial use practical. The formation of pellets improves attrition resistance of friable zeolites and creates porous and permeable structures that improve ion diffusion from solution. The carbon matrix enhances the capacity of the pellets to scavenge metals from solution. Pelletized natural zeolites can be produced at a fraction of the cost of synthetic zeolites.

Thus, it is an object of the present invention to provide an effective natural zeolite ion exchange medium in pellet form.

It is a further object of the present invention to provide an inexpensive method of producing such effective ion exchange media from natural zeolite fines previously considered waste products.

These and other objects and advantages of the present invention will become apparent from the following detailed description of the preferred embodiment.

DETAILED DESCRIPTION OF THE INVENTION

Figure 1:
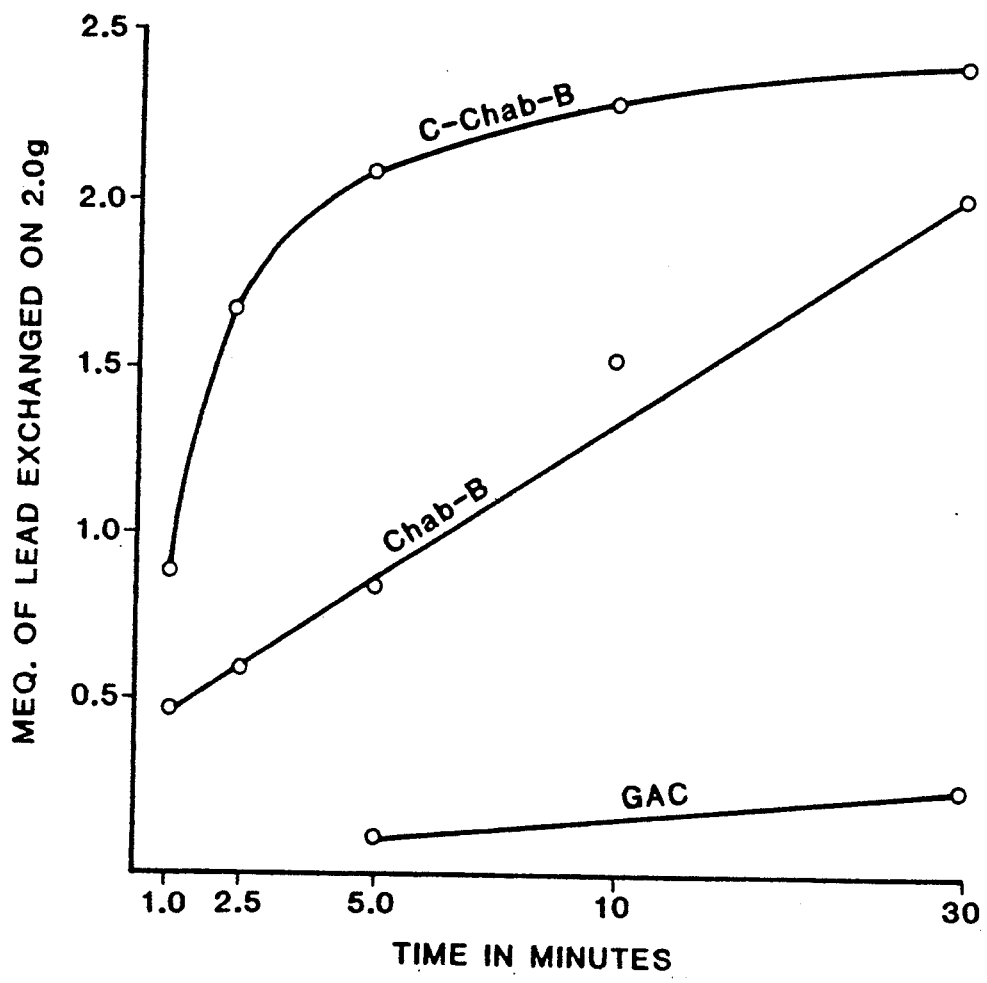
FIG. 1 is a graph depicting test results showing ion exchange rates in the media of the present invention in comparison with untreated natural zeolite media.

Currently, common uses of natural zeolites are as pet waste and other adsorbents and filtration media. Granular crushed and sieved zeolite is required for these uses. Dust and fines are produced as undesirable byproducts or waste products. The present invention makes use of these waste product zeolite fines to produce a pelletized natural zeolite product having greatly improved ion exchange properties compared with granular products from the natural zeolite precursor.

According to the present invention, natural zeolite fines of less than about 600 micronsize, preferably with at least 50% being of less than 300 micronsize are mixed with a lignosulfonate and formed into pellets. The lignosulfonate is sprayed onto or mixed with the zeolite fines in a proportion of from about 4% by weight to about 20% by weight depending on the moisture content of the zeolite fines and the concentration of the lignosulfonate solution. A solution of at least 20% lignosulfonate solids is preferred.

Alternatively, lignosulfonate powder may be mixed with zeolite fines in a proportion of from about 2% to about 8% by weight of the lignosulfonate.

The zeolite fines-lignosulfonate mixture is pelletized by any of the well known methods such as by pan agglomeration, extrusion, micro-briquetting, tableting or others to form pellets of from about 2 mm. to about 7 mm. in diameter (preferably about 4.0 mm. diameter). The pellets are dried and heated for a time and to a temperature sufficient to decompose the lignosulfonate usually about 400° C. but not above the decrepitation temperature of the zeolite or about 650° C.

More than 40 zeolite minerals have been identified worldwide. The process of this invention can utilize fines from any of these natural zeolite minerals. The choice of the zeolite to be used will depend on cost, availability and physical and chemical properties and the nature of the waste stream to be treated. Each of these zeolite minerals has its own unique chemical composition, framework density, configuration and size of molecular channels. Zeolites of different mineral species and deposits may be blended prior to pelletizing to provide optimal characteristics for removal of contaminants from a particular waste water stream.

Lignosulfonates are sulfonated lignin with phenylpropane units bound to methoxyl, hydroxyl, sulfonic, and carboxyl functional groups. During the heating of the pellets the lignosulfonate goes through a carbonizing process wherein the structure of the compound is altered leaving a resistant residue that resembles activated carbon in its surface chemistry properties. The carbon residue creates a lyophilic surface that bonds zeolite fines and dust particles into an open network and forms a large surface for ion-diffusion. the carbon residue itself can potentially bond with ionic substances and neutral or non-charged substances by forming a hydrogen bond.

Lignosulfonates of the calcium, sodium or ammonium type and other forms of lignosulfonate may be used in the process of the present invention as well as any other pellet binding material that will burn or decompose at a temperature of less than about 650° C. and leave a carbon residue.

The following examples illustrate the process for the present invention and the results obtained thereby.

EXAMPLE 1

A granular natural zeolite mineral ore of chabazite from Bowie, Az was prepared by crushing and sieving a small sample to minus 1,000 microns, plus 425 microns. The carbonized pellets of the same chabazite mineral ore were prepared by taking the minus 425 micron fines from crushing of the aforementioned sample and pelletizing them in an 18 inch diameter, rotating, pan-agglomerator. Calcium lignosulfonate was sprayed onto the chabazite fines in the rotating pan to form pellets of approximately 4.0 mm diameter. The pellets were dried and carbonized at 500° C. in a revolving, stainless-steel, open-mesh tube. A propane fired flame was applied to the outside of the tube as the heat source.

Two grams each of natural zeolite granules and carbonized pellets were weighed and placed in polyethylene bottles with a pre-measured and assayed solution of lead nitrate. The bottles were agitated for specified times and decanted. The filtered supernate was analyzed by atomic absorption for lead. The results in milequivalent amounts of lead exchanged onto the granules and pellets are shown in FIG. 1. The CEC of lead on granular chabazite (Chab-B) is linear, whereas the CEC on the carbonized chabazite pellets (C-Chab-B) is very rapid initially with a slowing of the rate as the media reaches saturation. The effective CEC capacity of the carbonized pellets is greater than the granular chabazite through the five assayed collection points. The adsorption of lead on granular activated carbon (GAC) is shown to demonstrate the superior ability of the zeolite samples to exchange lead. The rapid uptake of lead on the carbonized zeolite pellets is attributed to increased ion-diffusion in the porous, permeable structure created by the carbonization of the zeolite fines.

EXAMPLE 2

Figure 2:
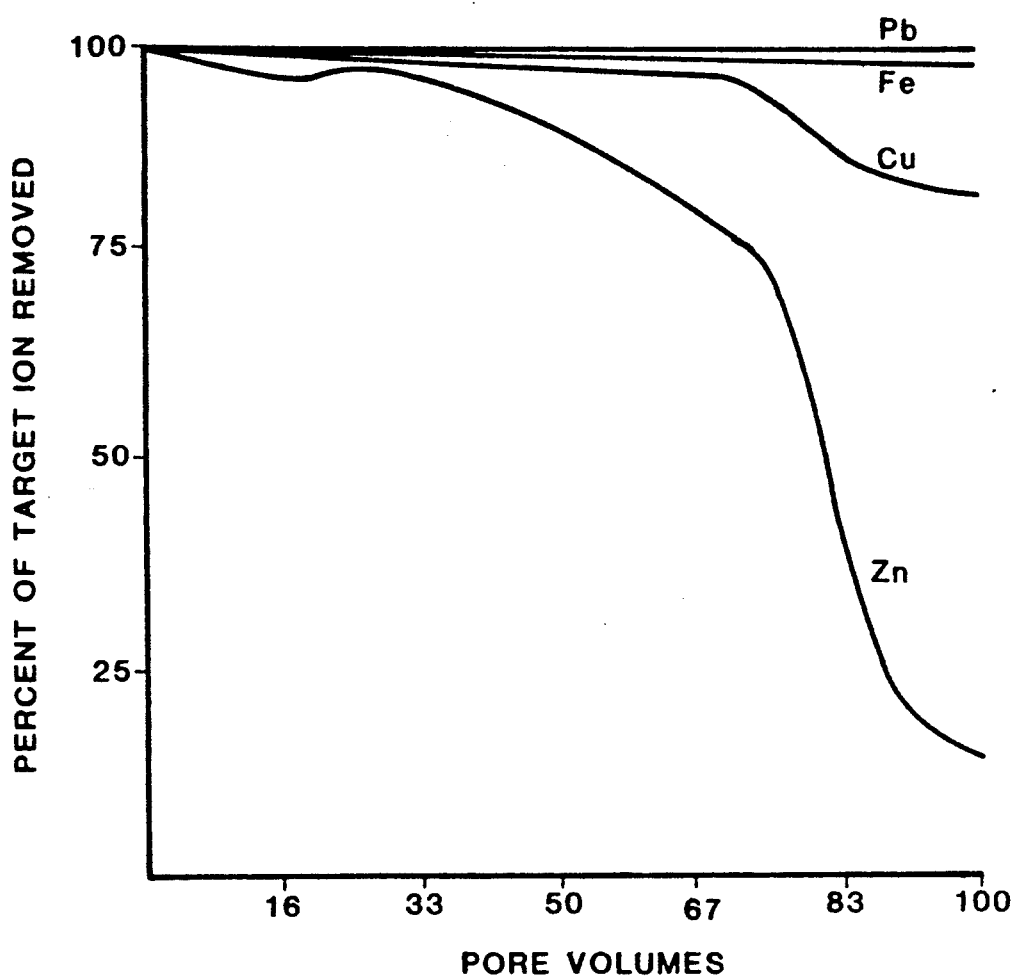
FIG. 2 is a graph illustrating the percentages of heavy metals removed by ion exchange media of the present invention from an influent solution as characterized in Table I.

A pelletized and carbonized sample of chabazite was prepared as described in Example 1. Ten grams of the prepared media was placed in a polycarbonate tube with one hole stoppers at each end. Mine drainage water from the Yak Tunnel, Leadville, Co. was spiked with copper, lead and iron to give the cation composition listed as "influent solution" in Table 1. Influent solution was fed by gravity through the column at four pore volumes per hour and collected in 200 ml increments for assay. The data are shown in FIG. 2 as a percentage of ions removed from the influent solution vs. pore volumes of solution passed through the media. Over 99 percent of lead and 97 percent of iron were removed from the influent solution through 100 pore volumes. Copper was removed to less than one milligram per liter through 64 pore volumes and then began to break through. At 100 pore volumes 82 percent of the copper was still being removed. Zinc was effectively removed through 32 pore volumes and then began to break through rapidly. Table 1 compares the cation concentration of influent solution with effluent solution sampled at 48 pore volumes. The pelletized and carbonized zeolite product effectively removed the toxic, heavy metals from solution and released non-toxic sodium to maintain a stoichiometric balance.

TABLE 1

| Analysis of water from Yak Tunnel, Leadville, Colorado in milligrams per liter | | | |
|---|---|---|---|
| INFLUENT SOLUTION | | EFFLUENT SOLUTION SAMPLED at 48 pore Volumes | |
| Cu 54.0 | Na 2.0 | Cu < 0.2 | Na 242.0 |
| Fe 29.0 | K 1.7 | Fe 0.7 | K .0.8 |
| Pb 4.3 | Ca 84.0 | Pb < 0.1 | Ca 7.3 |
| Zn 50.0 | Mg 48.0 | Zn 6.0 | Mg 52.0 |
| Mn 16.0 | Al 0.5 | Mn 3.5 | Al 2.2 |

EXAMPLE 3

Figure 3:
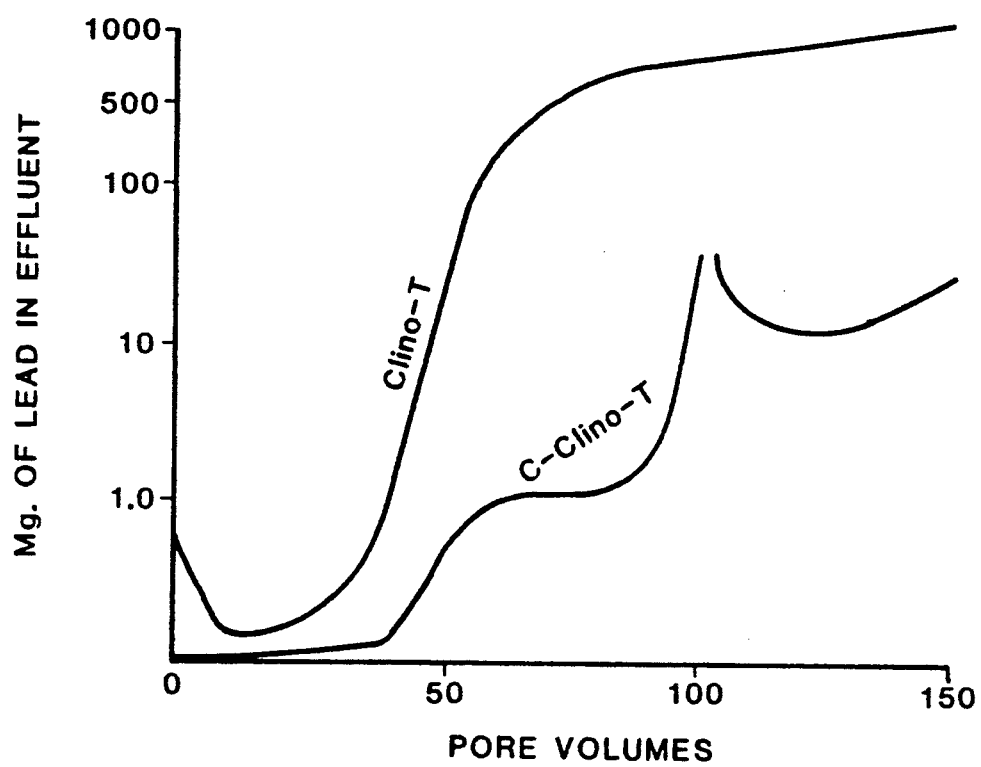
FIG. 3 is a graph illustrating results of the test set forth in Example 3.

Ion-exchange columns were constructed with 3 inch ID by 12 inch long polycarbonate tubes screened and stoppered at both ends. Approximately 10 inches of media was loaded onto each column. Feed solution contained in collapsible polyethylene bags was gravity driven through the columns from the bottom up to minimize entrapped gas. Pore volumes were calculated for each column by subtracting the volume of crystalline material loaded in the column from the total volume. Pore volumes (PV) of effluent solution were collected for analysis every six hours and pH was monitored throughout the experiment. Samples were analyzed for lead and occasionally for exchanged ions. Results are shown in FIG. 3.

The column test consisted of a solution of 750 mg/l lead in deionized water at a pH of about 3.5 run through columns of clinoptilolite from Tilden, Tx. (Clino-T) and pelletized and carbonized clinoptilolite from Tilden, Tx (C-Clino-T) prepared as indicated in this application. The zeolite products initially removed the 750 mg/l lead influent to within EPA standards for drinking water (0.05 mg/l). Clino-T breaks through very rapidly after 30 PV from 1.0 mg/l to 100 mg/l lead. C-Clino-T removes the 750 mg/l lead influent to less than 1.5 mg/l lead through 90 PV. A mistake in setting the flow rate for C-Clino-T resulted in 11 PV passing through the column on one 6 hour collection period. The increased flow destroyed the concentration gradient in the column and resulted in premature breakthrough as shown by the sharp inflection in the curve for C-Clino-T in FIG. 3. After the flow was returned to the normal collection rate the effluent lead dropped back down to less than 10 mg/l. The carbonized pellets show increased exchange capacity compared to their granular, natural mineral precursor. C-Clino-T buffers the pH of the influent solution to a greater extent than the regular zeolite granules. Analysis of influent and effluent solutions show that there is a molecular balance, therefore, the mechanism for removal of lead is ion-exchange rather than precipitation of lead in the media as a result of the pH change.

Thus, there has been disclosed a process for producing natural zeolite ion exchange media in a new carbonized matrix formed from natural zeolite fines previously considered waste products.

While the invention has been disclosed by examples of specific embodiments, it is to be understood that many changes and modifications of the described processes and products still within the spirit and scope of the invention will occur to those skilled in the art and therefore this invention is to be limited only as set forth in the following claims.

What is claimed is:

1. An ion exchange medium in the form of a pelletized, bonded matrix consisting essentially of naturally zeolite particles and carbon, said zeolite particles having a diameter no more than about 600 microns.

2. The medium of claim 1 wherein carbon is present in an amount of from about 2% to about 8% by weight.

3. The medium of claim 1 wherein said natural zeolite mineral is selected from the group consisting of clinoptilolite, mordenite, eronite, phillipsite, chabazite, faujasite, huelandite and mixtures thereof.

4. The medium of claim 1 wherein at least 50% of said zeolite particles are of a diameter of less than 300 microns.

5. The medium of claim 2 wherein at least 50% of said zeolite particles are of a diameter of less than 300 microns.

6. The medium of claim 5 wherein said natural zeolite mineral is selected from the group consisting of clinoptilolite, mordenite, eronite, phillipsite, chabazite, faujasite, huelandite and mixtures thereof.

7. The medium of claim 5 wherein the carbon content is about 4% (optimal) by weight.

8. The medium of claim 7 wherein said natural zeolite mineral is selected from the group consisting of clinoptilolite, mordenite, eronite, phillipsite, chabazite, faujasite, huelandite and mixtures thereof.

9. The medium of claim 8 wherein said natural zeolite mineral is chabazite.

10. The medium of claim 8 wherein said natural zeolite mineral is clinoptilolite.

11. A method of preparing pelletized ion exchange media comprising the steps of: forming pellets consisting essentially of natural zeolite mineral particles of diameters less than about 600 microns bonded together with a lignosulfonate and heating said pellets for a time and to a temperature sufficient to carbonize said lignosulfonate but insufficient to decrepitate said zeolite mineral.

12. The method of claim 11 wherein at least 50% of said zeolite particles are of diameters less than about 300 microns.

13. The method of claim 11 wherein said zeolite mineral is from the group consisting of clinoptilolite, mordenite, eronite, phillipsite, chabazite, faujasite, huelandite and mixtures thereof.

14. The method of claim 11 wherein said temperature is between about 400° C. and about 650° C.

15. The method of claim 14 wherein said zeolite mineral is from the group consisting of clinoptilolite, mordenite, eronite, phillipsite, chabazite, faujasite, huelandite and mixtures thereof and at least 50% of said zeolite particles are of diameters less than about 300 microns.

16. The method of claim 15 wherein said lignosulfonate is of a type selected from the group consisting of calcium, sodium, potassium and ammonium types.

17. The method of claim 16 wherein said ligonosulfonate is applied to said zeolite particles as an aqueous solution.

18. The method of claim 6 wherein said lignosulfonate is applied to said zeolite particles in power form.

19. The method of claim 17 wherein said pelletized medium contains from two to eight percent by weight of carbon.

20. The method of preparing pelletized ion exchange media comprising the steps of spraying zeolite mineral chabazite particles having diameters less than about 450 microns with a calcium lignosulfonate in a rotating pan agglomerator to form pellets of approximately 4mm. diameter and drying and heating said formed pellets to a temperature of approximately 500° C. to carbonize said lignosulfonate and produce a matrix consisting essentially of natural zeolite fines bonded with water insolube carbon.

* * * * *

UNITED STATES PATENT AND TRADEMARK OFFICE
CERTIFICATE OF CORRECTION

PATENT NO. : 5,214,013
DATED : May 25, 1993
INVENTOR(S) : Stephen L. Peterson

It is certified that error appears in the above-indentified patent and that said Letters Patent is hereby corrected as shown below:

In Column 5, Line 22, the word "naturally" should be -- natural --;

In Column 6, Line 30, the word "ligonosul-" should be -- lognosul- --;

In Column 6, Line 33, the figure "6" should be -- 16 --;

In Column 6, Line 34, the word "power" should be -- powder --;

In Column 6, Line 39, insert the word "natural" between the words 'spraying' and 'zeolote';

In Column 6, Line 47, the word "insolube" should be -- insoluble --.

Signed and Sealed this

Fourteenth Day of June, 1994

Attest:

BRUCE LEHMAN

Attesting Officer

Commissioner of Patents and Trademarks